(12) United States Patent
Thaib

(10) Patent No.: US 11,506,232 B2
(45) Date of Patent: Nov. 22, 2022

(54) CLAMPING DEVICE

(71) Applicant: Najiyah Thaib, Kuala Lumpur (MY)

(72) Inventor: Najiyah Thaib, Kuala Lumpur (MY)

(*) Notice: Subject to any disclaimer, the term of this patent is extended or adjusted under 35 U.S.C. 154(b) by 0 days.

(21) Appl. No.: 17/329,234

(22) Filed: May 25, 2021

(65) Prior Publication Data

US 2021/0277921 A1    Sep. 9, 2021

Related U.S. Application Data

(63) Continuation of application No. PCT/MY2020/050009, filed on Feb. 13, 2020.

(51) Int. Cl.
| | | |
|---|---|---|
| *F16B 2/10* | (2006.01) | |
| *A44B 11/12* | (2006.01) | |
| *A62B 35/00* | (2006.01) | |
| *A44B 11/25* | (2006.01) | |

(52) U.S. Cl.
CPC .......... *F16B 2/10* (2013.01); *A44B 11/12* (2013.01); *A44B 11/2523* (2013.01); *A62B 35/0037* (2013.01)

(58) Field of Classification Search
CPC . F16B 2/10; A44B 11/06; A44B 11/12; A44B 11/2523; A62B 35/0037
See application file for complete search history.

(56) References Cited

U.S. PATENT DOCUMENTS

| | | | |
|---|---|---|---|
| 9,494,175 B2* | 11/2016 | Wu ........................... | F16B 2/10 |
| 9,814,282 B2 | 11/2017 | Merrick | |
| 11,147,360 B2* | 10/2021 | Michael .................. | A45F 5/021 |
| 2007/0193004 A1* | 8/2007 | Chou ...................... | A44B 11/06 |
| | | | 24/170 |
| 2008/0313861 A1 | 12/2008 | Clifton, Jr. | |
| 2015/0080943 A1* | 3/2015 | Ye ....................... | A61B 17/1327 |
| | | | 606/203 |
| 2016/0021986 A1* | 1/2016 | Walden .................. | A44B 11/12 |
| | | | 24/197 |

FOREIGN PATENT DOCUMENTS

| | | |
|---|---|---|
| KR | 20080003717 U | 9/2008 |
| KR | 101788193 B1 | 10/2017 |
| WO | 0041920 A1 | 7/2000 |
| WO | 2018044183 A1 | 3/2018 |

* cited by examiner

*Primary Examiner* — Robert Sandy

(57) ABSTRACT

A clamping device for belts or ropes including a lower panel—including a flat surface portion perpendicularly integrated with a securing plate having a recess; and an upper panel including a push button for unlocking the clamping device; a locking panel located in between the lower panel and the upper panel including a pressing lever engaged with a protruding panel through the protruding end of the panel, and a pair of springs; the pair of springs are integrated at the sides of the pressing lever and connected at the sides of protruding panel to form a retractable locking combination; the clamping device is in a locking position when the protruding panel is inserted into the recess of the securing plate; and the clamping device is in an unlocking position when the protruding panel is retracted from the recess of the securing plate by pushing the push button.

6 Claims, 2 Drawing Sheets

CLAMPING DEVICE

CROSS-REFERENCE TO RELATED APPLICATIONS

This application is a continuation of International Patent Application PCT/MY2020/050009, filed on Feb. 13, 2020, and claims the benefit of priority from Malaysian Patent Application No. PI 2019001463, filed on Mar. 19, 2019. The content of the aforementioned application, including any intervening amendments thereto, is incorporated herein by reference.

TECHNICAL FIELD

The present invention relates to a clamping device, particularly a clamping device that can be used to clamp down belts or ropes.

BACKGROUND ART

Typically, there are various holding means used for holding belts or ropes. For example, a safety harness worn by workers in a high-rise construction building, or a person doing mountain climbing activity conventionally uses carabiners to secure the harness onto a safety line at a specific point. The shape of the carabiner itself has limited its function only to a rope loop or metal bracket. It cannot be used to clamp down a rope at any position safely. Some securing means require a pair of connections which need to be pre-installed. This type of securing means only has one specific function and unable to perform in case one part is faulty.

U.S. Pat. No. 9,814,282 B2 depicted an example of buckle assemblies for harsh environment. Although the invention was made robust, it still requires a pair of connections to function properly.

The above problems suggest requirements for further developing a clamping device to address these kinds of problems. For this reason, there is a need for a clamping device that can clamp down a belt or rope at any position securely.

The above information is presented as background information only to assist with an understanding of the present disclosure. No determination has been made, and no assertion is made, as to whether any of the above might be applicable as prior art with regard to the present disclosure.

SUMMARY OF THE INVENTION

Aspects of the present disclosure are to address the above-mentioned problems and/or disadvantages and to provide at least the advantages described throughout this patent specification. The present application describes a clamping device for belts or ropes comprising a lower panel an upper panel and a locking panel; wherein one end of said upper panel and locking panel are pivotally connected to one end of said lower panel and the said locking panel is located between said lower panel and upper panel; characterized in that a holder aperture at one end side of the bottom portion of said lower panel; a base plate with a slot opening for holding a belt or rope is pivotally connected to said holder aperture; a gripping teeth member on one side of said lower panel is engageable by said locking panel; and an opening on said locking panel corresponds with the size of said gripping teeth member.

In another aspect of the invention, said lower panel further comprises a flat surface portion that is engageable by said locking panel for holding and locking a belt or rope.

According to yet another aspect of the invention, said lower panel further comprises a securing plate with recess on another end of said lower panel that is perpendicular to said flat surface portion.

Preferably, said locking panel further comprises a base that is engageable to said flat surface portion.

According to another aspect of the invention said locking panel further comprises a pressing lever mounted on top of said base and a protruding panel on one end of said pressing lever wherein said protruding panel is inserted in said recess of said securing plate when said clamping device in locking position.

Preferably, said upper panel further comprises a push button that is engageable to said protruding panel on said locking panel for unlocking said clamping device.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

BRIEF DESCRIPTION OF THE DRAWINGS

The above and other aspects, features, and advantages of certain embodiments of the present disclosure will be more apparent from the following description taken in conjunction with the accompanying drawing, in which.

DETAILED DESCRIPTION OF THE INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents. Depending on the context of the sentence, the reading of this patent specification should be done with the same concept as "reject the absurd", wherein if possible, a specification should be construed so as not to lead to a foolish result or one which the patentee could not have contemplated.

It is to be understood that the singular forms "a", "an," and "the" include plural referents unless the context clearly dictates otherwise. Thus, for example, reference to "a gripping teeth member" includes reference to one or more of such gripping teeth member.

Figure 1:
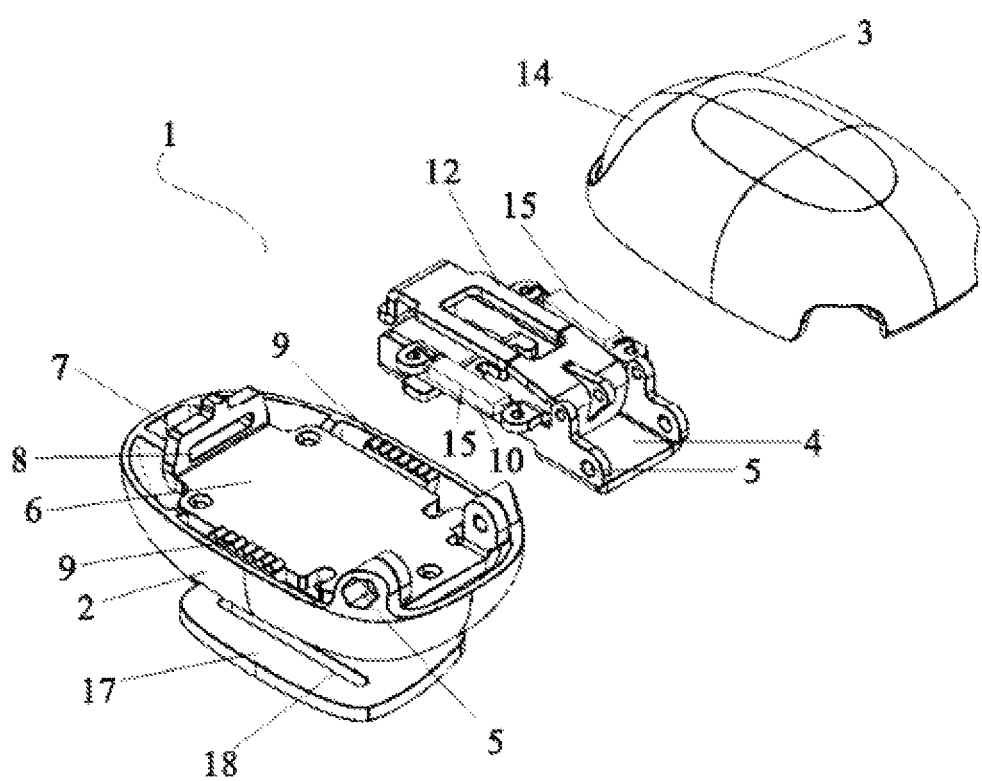
FIG. 1 is the clamping device as in the present invention.

FIG. 1 shows the clamping device 1 for belts or ropes as in the present invention comprising a lower panel 2 an upper panel 3 and a locking panel 4. One end of the upper panel 3 and locking panel 4 are pivotally connected to one end of the lower panel 2 at the hinge point 5. The locking panel 4 is located between the lower panel 2 and upper panel 3.

The lower panel 2 further comprises a flat surface portion 6 that is engageable by the locking panel 4 for holding and locking a belt or rope. This flat surface portion 6 is slightly lower than the side edges of the lower panel 2. The lower panel 2 also has a securing plate 7 with recess 8 on another end of the lower panel 2 that is perpendicular to the flat surface portion 6.

A gripping teeth member 9 on one side of the lower panel 2 is engageable by the locking panel 4 during locking position. The top edge of the gripping teeth member 9 is slightly above the side edges of the lower panel 2 to provide better gripping action to further secure the belt or rope.

Figure 2:
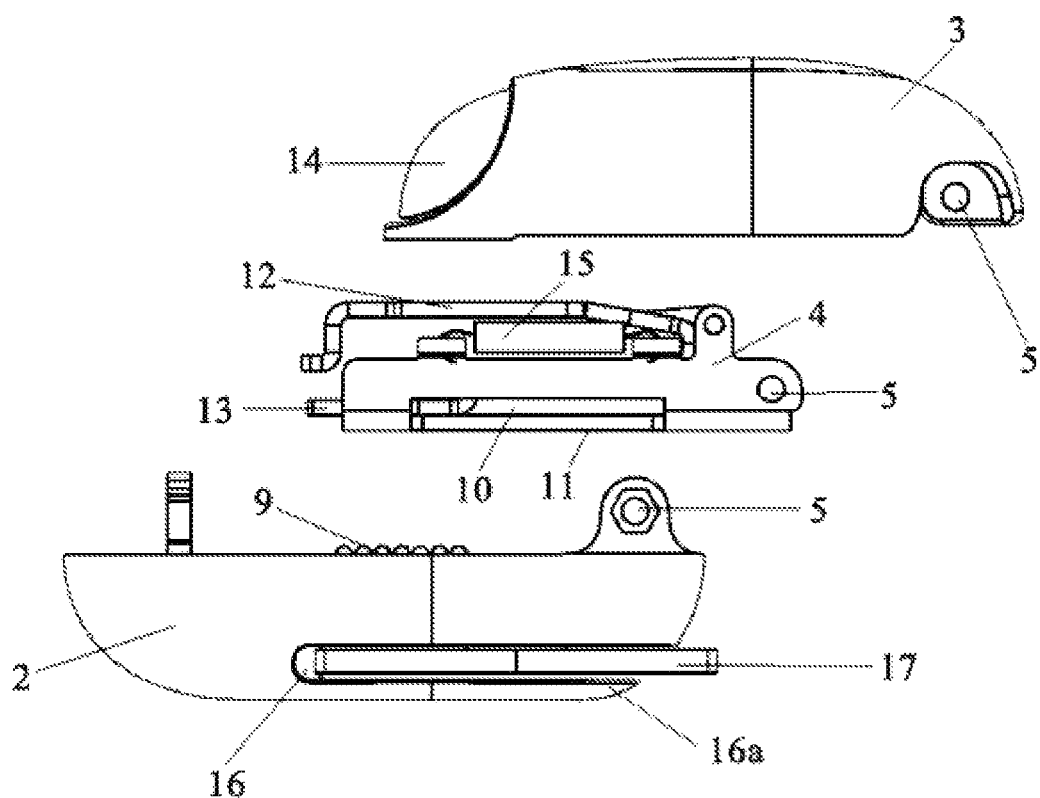
FIG. 2 is the side view of clamping device as in the present invention.

On the locking panel 4, there is an opening 10 that corresponds with the size of the gripping teeth member 9 as shown in FIG. 2. When the clamping device 1 is in use, the belt or rope will be gripped between the gripping teeth member 9 and the opening 10. The locking panel 4 also has a base 11 that is engageable to the flat surface portion 6. The belt or rope is clamped between the base 11 and the flat surface portion 6.

Locking panel 4 further comprises a pressing lever 12 mounted on top of base 11 and a protruding panel 13 on one end of the pressing lever 12. When clamping device 1 is in locking position, the protruding panel 13 is inserted in the recess 8 of the securing plate 7. To unlock the clamping device 1, a push button 14 on the upper panel 3 is engageable to the protruding panel 13 on the locking panel 4 when pushed by the user. A pair of springs 15 on the side of pressing lever 12 will retract the protruding panel 13 from recess 8.

There is a holder aperture 16 at one end side of the bottom portion of the lower panel 2. A base plate 17 with a slot opening 18 that can be used for holding a belt or rope is pivotally connected to the holder aperture 16. This will allow the clamping device 1 to be attached by a belt or rope from a safety harness or any other device. The base plate 17 can swivel in the holder aperture 16 according to the belt or rope movement while the clamping device 1 will stay in position.

Figure 3:
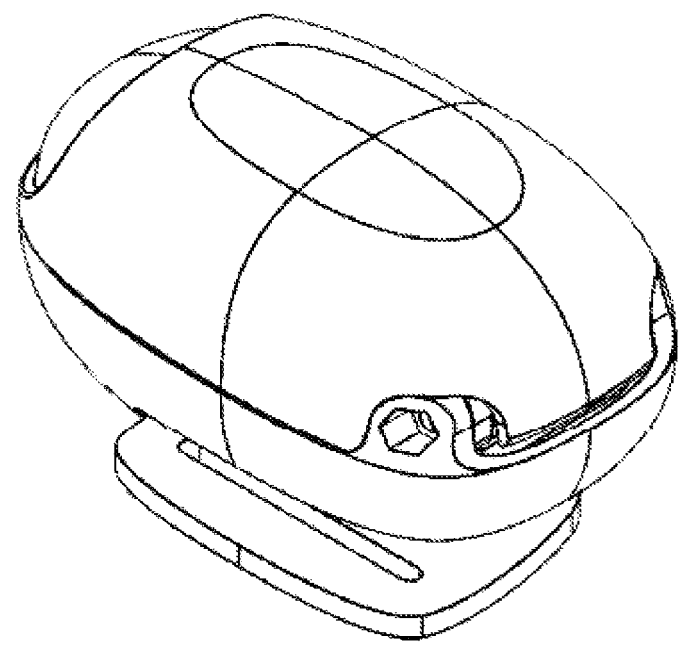
FIG. 3 is the full assembly of the clamping device as in the present invention.

FIG. 3 is the complete assembly of the clamping device 1 according to the present invention. The lower panel 2 also has a rounded base 16a to avoid inflicting injury to the user. In the first embodiment of the clamping device 1 as in the present invention, all the components are preferably made of metal material such as stainless steel like SUS 316, aluminum or titanium. This variant is suitable for heavy duty or in harsh environment application.

According to the second embodiment of the clamping device 1 as in the present invention, the casing of the lower panel 2 and upper panel 3 are preferably made of plastic and having rounded edges while the internal parts like the locking panel 4 is preferably made of metal. The base plate 17 that is used for holding belt or rope is also preferably made of metal.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

To the accomplishment of the foregoing and related ends, one or more various embodiments include the features hereinafter fully described and particularly pointed out in the claims. The following description and the annexed drawings set forth in detail certain illustrative aspects and are indicative of but a few of the various ways in which the principles of the various embodiments may be employed. Other advantages and novel features will become apparent from the following detailed description when considered in conjunction with the drawings and the disclosed various embodiments are intended to include all such aspects and their equivalents.

Other aspects, advantages, and salient features of the disclosure will become apparent to those skilled in the art from the following detailed description, which, taken in conjunction with the annexed drawings, discloses various embodiments of the present disclosure.

What is claimed is:

1. A clamping device (1) for belts and ropes comprising:
    a lower panel (2) comprising a flat surface portion (6) that is perpendicularly integrated with a securing plate (7) having a recess (8) and a gripping teeth member (9) at each side of the flat surface portion (6); and
    an upper panel (3) comprising a push button (14) for unlocking said clamping device (1);
    characterized by
    a locking panel (4) located in between the lower panel (2) and the upper panel (3), the locking panel comprising a pressing lever (12) engaged with a protruding panel (13) through a protruding end of said panel (13), and a pair of springs (15); wherein the pair of springs (15) are integrated at the sides of the pressing lever (12) and connected at the sides of the protruding panel (13) to form a retractable locking combination;
    wherein the clamping device (1) is in a locking position when the protruding panel (13) is inserted into the recess (8) of the securing plate (7); and
    wherein the clamping device (1) is in an unlocking position when the protruding panel (13) is retracted from the recess (8) of the securing plate (7) by pushing the push button (14) that is engageable to the protruding panel (13).

2. The clamping device (1) as claimed in claim 1, wherein the flat surface portion (6) is engageable by said locking panel (4) for holding and locking a belt or rope.

3. The clamping device (1) as claimed in claim 2, wherein said locking panel (4) further comprises a base (11) that is engageable to said flat surface portion (6).

4. The clamping device (1) as claimed in claim 1, wherein one end of said upper panel (3) and locking panel (4) are pivotally connected to one end of said lower panel (2).

5. The clamping device (1) as claimed in claim 1, wherein the lower panel (2) comprising a holder aperture (16) at one end side of the bottom portion of said lower panel (2).

6. The clamping device (1) as claimed in claim 5, wherein the lower panel (2) comprising a base plate (17) with a slot opening (18) for holding a belt or rope pivotally connected to the holder aperture (16).

\* \* \* \* \*